United States Patent
Sundar et al.

(10) Patent No.: US 8,494,243 B2
(45) Date of Patent: Jul. 23, 2013

(54) DEFORMABLE 2D-3D REGISTRATION OF STRUCTURE

(75) Inventors: Hari Sundar, Piscataway, NJ (US); Ali Kamen, Princeton, NJ (US); Rui Liao, Princeton Junction, NJ (US); Darko Zikic, München (DE); Martin Groher, München (DE); Yunhao Tan, Sunnyvale, CA (US)

(73) Assignee: Siemens Aktiengesellschaft, München (DE)

( * ) Notice: Subject to any disclaimer, the term of this patent is extended or adjusted under 35 U.S.C. 154(b) by 567 days.

(21) Appl. No.: 12/789,521

(22) Filed: May 28, 2010

(65) Prior Publication Data
US 2011/0026794 A1 Feb. 3, 2011

Related U.S. Application Data

(60) Provisional application No. 61/229,397, filed on Jul. 29, 2009.

(51) Int. Cl.
*G06K 9/00* (2006.01)

(52) U.S. Cl.
USPC .......................................... 382/131; 382/128

(58) Field of Classification Search
USPC ... 382/128, 131, 132, 154, 284, 294; 128/922
See application file for complete search history.

(56) References Cited

U.S. PATENT DOCUMENTS

2005/0203385 A1* 9/2005 Sundar et al. ................. 600/427

OTHER PUBLICATIONS

A Novel 2D-3D Registration Algorithm for Aligning Fluoro Images with 3D Pre-op CT/MR Images, Sundar et al., Medical Imaging 2006: Visualization, Image-Guided Procedures, and Display, edited by Kevin R. Cleary, Robert L. Galloway, Jr., Proc. of SPIE vol. 6141, 61412K, (2006).*

* cited by examiner

*Primary Examiner* — Gerald J. O'Connor
*Assistant Examiner* — Jason Tiedeman
(74) *Attorney, Agent, or Firm* — Donald B. Paschburg; F. Chau & Associates, LLC

(57) ABSTRACT

A method for performing deformable non-rigid registration of 2D and 3D images of a vascular structure for assistance in surgical intervention includes acquiring 3D image data. An abdominal aorta is segmented from the 3D image data using graph-cut based segmentation to produce a segmentation mask. Centerlines are generated from the segmentation mask using a sequential topological thinning process. 3D graphs are generated from the centerlines. 2D image data is acquired. The 2D image data is segmented to produce a distance map. An energy function is defined based on the 3D graphs and the distance map. The energy function is minimized to perform non-rigid registration between the 3D image data and the 2D image data. The registration may be optimized.

20 Claims, 8 Drawing Sheets

Fig. 6 repeat

61. Obtain a direction $\mathbf{v}^{(k)}$ by solving: $\mathbf{v}^{(k)} = -\mathbf{B}^{(k)-1}\nabla\mathcal{E}(\mathbf{u}^{(k)})$;

62. Perform a line search to find the best step size, $\lambda^{(k)}$; then update $\mathbf{u}^{(k+1)} = \mathbf{u}^{(k)} + \lambda^{(k)}\mathbf{v}^{(k)}$;

63. Let $\mathbf{u}^{(k)} = \lambda^{(k)}\mathbf{v}^{(k)}$;

64. Calculate the gradient difference, $\mathbf{e}^{(k)} = \nabla\mathcal{E}(\mathbf{u}^{(k+1)}) - \nabla\mathcal{E}(\mathbf{u}^{(k)})$;

65. Calculate the Hessian matrix, $\mathbf{B}^{(k+1)} = \mathbf{B}^{(k)} + \frac{\mathbf{e}^{(k)}\mathbf{e}^{(k)\top}}{\mathbf{e}^{(k)\top}\mathbf{u}^{(k)}} - \frac{\mathbf{B}^{(k)}\mathbf{u}^{(k)}(\mathbf{B}^{(k)}\mathbf{u}^{(k)})^{\top}}{\mathbf{u}^{(k)\top}\mathbf{B}^{(k)}\mathbf{u}^{(k)}}$;

66. Compute $\mathbf{B}^{(k+1)-1}$ from 5 or use Sherman-Morrison formula [12]:
$$\mathbf{B}^{(k+1)-1} = \mathbf{B}^{(k)-1} + \frac{(\mathbf{u}^{(k)\top}\mathbf{e}^{(k)} + \mathbf{e}^{(k)\top}\mathbf{B}^{(k)-1}\mathbf{e}^{(k)})(\mathbf{u}^{(k)}\mathbf{u}^{(k)\top})}{(\mathbf{u}^{(k)\top}\mathbf{e}^{(k)})^2} - \frac{\mathbf{B}^{(k)-1}\mathbf{e}^{(k)}\mathbf{u}^{(k)\top} + \mathbf{u}^{(k)}\mathbf{e}^{(k)\top}\mathbf{B}^{(k)-1}}{\mathbf{u}^{(k)\top}\mathbf{e}^{(k)}};$$

until $\|\mathbf{e}^{(k)}\| < \varepsilon$;

DEFORMABLE 2D-3D REGISTRATION OF STRUCTURE

CROSS-REFERENCE TO RELATED APPLICATION

The present application is based on provisional application Ser. No. 61/229,397, filed Jul. 29, 2009, the entire contents of which are herein incorporated by reference.

BACKGROUND OF THE INVENTION

1. Technical Field

The present disclosure relates to registration and, more specifically, to a method and system for deformable 2D-3D registration of structure.

2. Discussion of Related Art

Abdominal aortic aneurysm (AAA) is a localized expansion (i.e. ballooning) of the abdominal aorta. With AAA, there is a risk that the aneurysm may rupture if the expansion becomes large enough. In the event of a rupture, the chances of survival for the patients are low. AAA is among the leading causes of death in the U.S. While AAA is traditionally treated using open surgical repair, in recent years, minimal-invasive interventional have emerged as an alternative to open surgeries for the treatment of AAA. This may be particularly apparent for patients who are at an increased surgical risk due to age or other medical conditions.

During the interventional procedure for the repair of AAA, as with other forms of vascular intervention, X-ray imaging may be used for the guidance and navigation of a catheter and graft within the aorta. For example, fluoroscopy may be used to capture periodic or continuous x-ray images so that the catheter and graft may be visualized during the intervention. As the X-ray imagery tends to lack sufficient visualization of the aorta and other vasculature, radiocontrast may be used to enhance visualization.

However, performing interventions using monoplane fluoroscopic images is difficult both because of the lack of detail and depth. Lack of detail may be particularly problematic where radiocontrast is not used. Use of radiocontrast, however, increases patient exposure to radiation and may in certain situations obstruct visualization of the catheter and graft.

Modern techniques for providing visual guidance during vascular intervention such as endovascular AAA repair may thereby combine pre-operative 3D volumetric data such as an MRI or CT scan with intra-operative 2D X-ray images to provide realistic artery anatomy with minimal or no need for radiocontrast. Moreover, such visual overlays may provide useful information to the physicians for finding the best path and target position.

Combining the pre-operative volumetric data with the intra-operative 2D X-ray data poses special difficulties as the size, shape and relative location of vascular anatomy is subject to change as the patient moves due to body motion, heart beat, breathing and the insertion of medical devices into the artery during AAA procedures.

Approaches have been proposed for the rigid alignment of pre-operative 3D imagery and intra-operative 2D images registration. While such approaches may be robust in the estimation of the general pose, these techniques may be unable to effectively correct for local deformations within the vessel.

While methods for deformable 2D/3D registration have been used, existing approaches may be ill-suited for application to vascular structures due at least in part due to the complex and repetitive structure and the high degree of deformation that may occur.

SUMMARY

A method for performing deformable non-rigid registration of 2D and 3D images of a vascular structure for assistance in surgical intervention includes representing the vascular structure within pre-operative 3D image data as a graph. Graph-based segmentation is performed on the graph to identify a structure of interest. Intra-operative 2D X-ray image data is segmented. A difference between the structure of interest within the 3D image data and the structure of interest within the 2D image data is represented as an energy. The expressed energy is minimized to perform non-rigid registration between the structure of interest within the 3D image data and the structure of interest within the 2D image data.

The pre-operative 3D image data may be a computed tomography (CT) volume data. The graph-based segmentation may include graph-cut segmentation wherein the graph is split into multiple segments based on relative weakness in edge attachments. The intra-operative 2D X-ray image data may be acquired using a fluoroscope. Expressing the difference between the structure of interest within the 3D image data and the structure of interest within the 2D image data as an energy may include calculating a sum of a distance energy, a length preservation energy, and a deformation smoothness energy.

The distance energy may be calculated according to the equation:

$$\mathcal{E}_d = \sum_{i=1}^{n} \mathcal{D}\left(\prod (x_i + u_i)\right)$$

wherein $\mathcal{D}$ is the distance transform image, $\Pi$ is the projection matrix corresponding to the X-ray image, u represents displacement and $x_i$ represents the 3D vessel centerlines.

The length preservation energy may be calculated according to the equation:

$$\mathcal{E}_l = -\sum_{i=1}^{n} k_i \|u_i\|_{\tau_i}$$

wherein $\tau_i$ represents a unit vector along vessel centerline, u represents displacement and k represents a spring constant.

The deformation smoothness energy may be calculated according to the equation:

$$\mathcal{E}_t = \nabla \cdot u$$

wherein u represents displacement.

Minimizing the expressed energy may include utilizing a gradient dissent approach whereby a gradient is calculated for the expressed energy, an initial guess of the displacement vector is produced and the initial guess is iterated until a norm of the gradient drops below a predetermined functional.

The energy may be expressed in accordance with the following equation:

$$\mathcal{E}(u) = \mathcal{D}(u) + \alpha \mathcal{S}_L(u) + \beta \mathcal{S}_D(u)$$

wherein u represents displacement, $\mathcal{D}(u)$ represents a difference measure, $\mathcal{S}_L(u)$ represents a length preserving term, $S_D(u)$ represents a smoothing term, and α and β are coefficients for balancing the length preserving term and the smoothing term, respectively.

The difference measure $\mathcal{D}(u)$ may be calculated according to the equation:

$$\mathcal{D} = \frac{1}{n}\sum_{i=1}^{n} M^2(d(y_i))$$

wherein n is the number of nodes, $d(y_i)$ is a 2D projection of an $i^{th}$ displaced node $y_i$ and M is a 2D distance map.

The length preserving term $S_L(u)$ may be calculated according to the equation:

$$S_L = \frac{1}{n}\sum_{i=1}^{n}\sum_{j=1}^{t_i}\left(\frac{l_j^p - l_j}{l_j}\right)^2$$

wherein n is the number of nodes, $l_j$ is an original length of an edge and $l_j^p$ is a new length of the same edge after deformation.

The deformation may be defined as $l_j^p = \|(x_j + u_j) - (x_i u_i)\|$ wherein the displacement node $y_i = x_i + u_i$.

The smoothness term $S_D(u)$ may be calculated according to the equation:

$$S_D = \frac{1}{n}\sum_{i=1}^{n}\sum_{j=1}^{t_i}\|u_i - u_j\|^2$$

wherein n is the number of nodes and u represents displacement.

A method for performing deformable non-rigid registration of 2D and 3D images of a vascular structure for assistance in surgical intervention includes acquiring 3D image data, segmenting an abdominal aorta from the 3D image data using graph-cut based segmentation to produce a segmentation mask, generating centerlines from the segmentation mask using a sequential topological thinning process, generating 3D graphs from the generated centerlines, acquiring 2D image data, segmenting the 2D image data to produce a distance map, defining an energy function based on the 3D graphs and the distance map, and minimizing the energy function to perforin non-rigid registration between the 3D image data and the 2D image data.

A computer system includes a processor and a non-transitory, tangible, program storage medium, readable by the computer system, embodying a program of instructions executable by the processor to perform method steps for performing deformable non-rigid registration of 2D and 3D images of a vascular structure for assistance in surgical intervention, the method includes acquiring 3D image data. An abdominal aorta is segmented from the 3D image data using graph-cut based segmentation to produce a segmentation mask. Centerlines are generated from the segmentation mask using a sequential topological thinning process. 3D graphs are generated from the generated centerlines. 2D image data is acquired. The 2D image data is segmented to produce a distance map. An energy function is defined based on the 3D graphs and the distance map. The energy function is minimized to perform non-rigid registration between the 3D image data and the 2D image data.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 6 is a flowchart illustrating an approach for optimization of minimizing energy function according to an exemplary embodiment of the present invention.

DETAILED DESCRIPTION OF THE DRAWINGS

Figure 1:
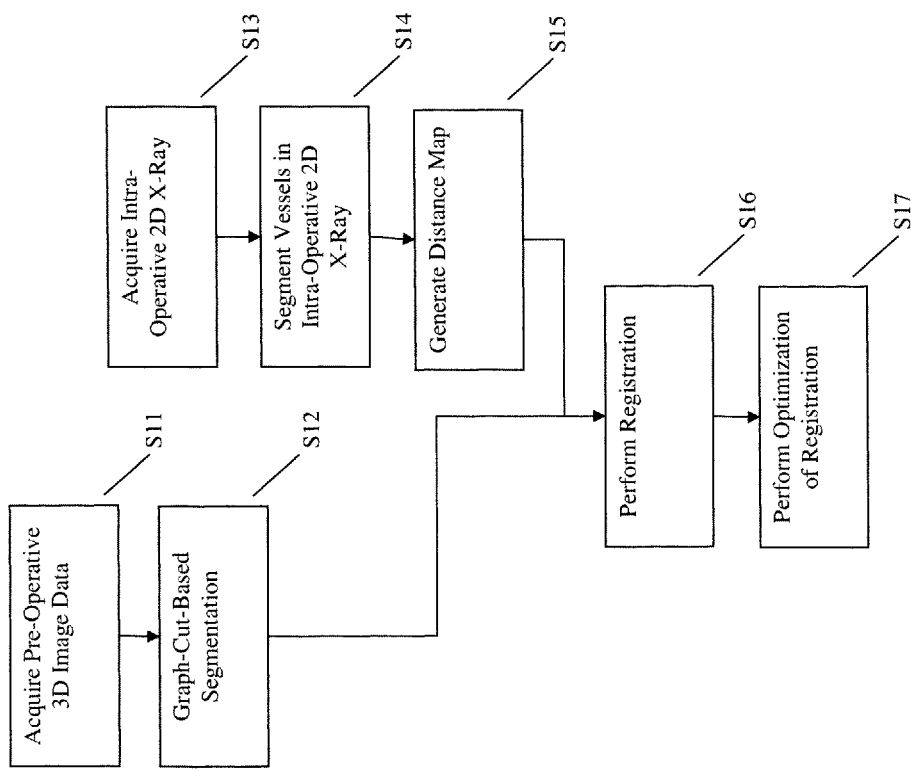
FIG. 1 is a flow chart illustrating an approach for deformable registration of 2D/3D medical images according to an exemplary embodiment of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide an efficient deformable 2D/3D registration method for vascular imagery, for example, as may be used during AAA interventions. According to some approaches, a 3D graph may be generated from the abdominal aorta segmented from pre-operative CT data, and a 2D distance map may be generated from each of the 2D X-ray images used for registration. A distance map may be a smooth shape encoding of the underlying structures, and may be applied to the registration problem. By utilizing a distance map, explicit establishment of point correspondences between 2D and 3D graphs may be avoided during optimization of the registration. This may reduce the optimization space to a lower dimensionality and simplify computational complexity. In addition, smoothness calculation may be defined on the 3D graph, the derivative of which can be calculated efficiently using the well-known Laplacian matrix of a graph. Specific to the anatomy of abdominal aorta, a hierarchical registration scheme may be further deployed. In particular, the 3D graph may be divided into three segments, renal arteries, iliac arteries, and abdominal aorta. A piecewise rigid-body transformation may first be applied individually to the three segments while their connectivity is maintained. Local deformation may then be estimated for the complete graph comprising all the three segments.

Accordingly, exemplary embodiments of the present invention may focus on the usage of two or more projection images for an accurate registration in 3D physical space.

FIG. 1 is a flow chart illustrating an approach for deformable registration of 2D/3D medical images according to an exemplary embodiment of the present invention. While registration is described herein in terms of guidance for AAA intervention, it should be understood that the techniques described herein may be applied more generally to registration of any vascular structure. First, pre-operative 3D image data, for example, CT volume data, may be acquired (Step S11). The pre-operative 3D image data may include the abdominal aorta. Next, the abdominal aorta may be segmented from the pre-operative 3D image data, for example, using graph-cut based segmentation (Step S12). The graph-cut based segmentation may involve first representing the 3D vasculature as a graph in which each branching of the vessel tree is represented as a node and each vessel segment is represented as an edge connecting two nodes. The graph may be formed, for example, by finding vessel centerlines using a topological thinning process and then generating the graph from the vessel centerlines. Graph-cut based segmentation may then be performed using existing techniques, for example, that may focus on splitting the graph into multiple segments based on relative weakness in edge attachment.

The intra-operative 2D X-ray image data may be acquired (Step S13). The intra-operative 2D X-ray image data may be acquired, for example, using a fluoroscope. Next, the vessel system may be segmented within the 2D X-ray image (Step S14). The intra-operative 2D X-ray image data may be segmented, for example, using a vesselness measure. A distance map may then be generated from the segmented intra-operative 2D X-ray image data (Step S15).

According to exemplary embodiments of the present invention, the intra-operative 2D X-ray image data may include X-ray imagery from two or more planes. In such a case, the intra-operative 2D X-ray image data may include multiple 2D images, with each image being separately segmented and having its own distance map. Moreover, the intra-operative 2D X-ray images may include a plurality of frames so that tracking may be performed in real-time so as to provide periodic or continuous visualization that may assist in the performance of the intervention procedure. However, for the purposes of simplicity of explanation, detailed description set forth herein may be limited to the initial registration between the pre-operative 3D image data and a single intra-operative 2D image. After this registration has been achieved, subsequent 2D X-ray frames may be performed more easily by using registration of prior frames as a starting point.

The distance map may provide an efficient way of computing the distance between two vessel centerlines, and need be computed only once before iterative optimization of registration begins.

Registration may then be performed between the 3D pre-operative volume data and the 2D intra-operative image data (Step S16). As indicated above, registration may be deformable registration. Exemplary embodiments of the present invention may formulate deformable registration as an energy minimization problem.

In setting up the energy minimization problem, a displacement vector may be calculated as a minimization of total energy, which may be defined as the sum of a first energy term (distance energy) corresponding to the distance between the 2D vasculature and a projection of the 3D vasculature into two-dimensions, a second energy term (length preservation energy) arising as a result of a length preserving criterion, and a third energy term (deformation smoothness energy) enforcing smoothness of the deformation of the vessel segments.

While the energy minimization problem may be formed in one of a variety of ways, according to an exemplary embodiment of the present invention, the graph representation of the pre-operative 3D image volume G, which may be an undirected, acyclic, and single-component graph, may be defined as having n nodes $x_{set}=\{x_i|i=1 \ldots n\}$, and m edges of length $l_{set}=\{l_i|i=1 \ldots n\}$. For each node $x_{i \in 2}x$, its first ring neighbor edge is denoted by $e_i$, where $e_i$ contains $t_i$ edges. The energy functional to be minimized may thus be expressed as:

$$\mathcal{E}(u) = \mathcal{D}(u) + \alpha \mathcal{S}_\mathcal{L}(u) + \beta \mathcal{S}_\mathcal{D}(u) \qquad (1)$$

where $u_{set}=\{u_i,i=1 \ldots n\}$ represents the node displacement to be estimated by minimizing the above energy functional. The final position of the node $x_i$ therefore is $y_i=x_i+u_i$. In the energy functional, $\mathcal{D}$ is the image-based difference measure (distance energy), $\mathcal{S}_\mathcal{L}$ is the length preserving term (length preservation energy) and $\mathcal{S}_\mathcal{D}$ is the smoothness regularization term (deformation smoothness energy). The terms $\alpha$ and $\beta$ are the coefficients balancing the corresponding terms in the energy functional. A gradient-based optimizer may then be adopted to gain computational efficiency. For this reason derivative of each term in Eq. 1 may be computed with respect to node displacement $u_i$.

The difference measure D may thus be computed as follows:

$$\mathcal{D} = \frac{1}{n} \sum_{i=1}^{n} M^2(d(y_i)) \qquad (2)$$

where $d(y_i)$ is the 2D projection of $i^{th}$ displaced node $y_i$ and M is the 2D distance map. Here, $y_i^h$ denotes the homogeneous coordinate of the $i^{th}$ node, e.g., $y_i^h=[y_i^T 1]^T$, therefore, $$d(y_i) = \left[ \frac{p_1^T y_i^h}{p_3^T y_i^h} \quad \frac{p_2^T y_i^h}{p_3^T y_i^h} \right]^T$$

where the 3×4 projection matrix $P=[p_1 p_2 p_3]^T$. The derivative of $\mathcal{D}$ with respect to $u_i$ is:

$$\frac{\partial \mathcal{D}}{\partial u_i} = \frac{1}{(p_3 y_i^h)^2} \left[ \begin{array}{c} p_1^{*T}(p_3^T y_i^h) - p_3^{*T}(p_1^T y_i^h) \\ p_2^{*T}(p_3^T y_i^h) - p_1^{*T}(p_2^T y_i^h) \end{array} \right] \nabla M \qquad (3)$$

where * denotes that only the first three elements of the vector is considered. The distance measure serves as a three dimensional force that moves each node toward the direction where its projection onto the distance map image is minimized.

In calculating the length preserving term $\mathcal{S}_\mathcal{L}$, it may be assumed that movement of the nodes are constrained such that the total length of the vessel is preserved. A stronger constraint that may be used ensures that the length of each edge in the graph is preserved. The edge length preserving term $\mathcal{S}_\mathcal{L}$ on the 3D graph may be formulated as follows:

$$S_\mathcal{L} = \frac{1}{n} \sum_{i=1}^{n} \sum_{j=1}^{t_i} \left( \frac{l_j^p - l_j}{l_j} \right)^2 \qquad (4)$$

where $l_j$ is the original length of an edge, and $l_j^p$ is the new length of the same edge after the deformation, e.g., $l_j^p=\|(x_j+u_j)-(x_i u_i)\|$. The derivative of the edge length preserving term $\mathcal{S}_\mathcal{L}$ with respect to $u_i$ may be computed as follows:

$$\frac{\partial S_L}{\partial u_i} = \frac{1}{n} \sum_{j=1}^{t_i} \frac{\partial \left(\frac{l_j^p - l_j}{l_j}\right)^2}{\partial u_i} = \frac{1}{n} \sum_{j=1}^{t_i} \frac{2(l_j^p - l_j)}{(l_j)2l_j^p}((x_i + u_i) - (x_j + u_j)) \quad (5)$$

Wherein, when $l_j^p < l_j$, this term forces the node to move away from its $j^{th}$ first-ring neighbor, and vice versa.

In calculating the smoothness term $S_D$, it may be assumed that neighboring nodes on the graph move coherently. The smoothness term $S_D$ may be computed as follows:

$$S_D = \frac{1}{n} \sum_{i=1}^{n} \sum_{j=1}^{t_i} \|u_i - u_j\|^2 \quad (6)$$

The derivative of $S_D$ with respect to $u_i$ may thus be calculated as:

$$\frac{\partial S_D}{\partial u_i} = \frac{1}{n} \sum_{j=1}^{t_i} \frac{\partial \|u_i - u_j\|^2}{\partial u_i} = \frac{1}{n} \sum_{j=1}^{t_i} 2(u_i - u_j) \quad (7)$$

This term forces the node to move toward the barycenter of its first ring neighbors, and may be calculated efficiently using the Laplacian matrix of a graph.

As described above, after initial registration has been performed (Step S16), optimization may be employed to enhance registration (Step S17). Approaches for optimizing the registration may be viewed as an unconstrained nonlinear optimization problem. To achieve optimization, minimizing the energy function of Eq. 1 may be performed, for example, based on the approach illustrated in FIG. 6. FIG. 6 is a flow-chart illustrating an approach for optimization of minimizing energy function according to an exemplary embodiment of the present invention. Here, parenthesized superscripts denote intermediate results for the $k^{th}$ iteration in the optimization.

As seen in FIG. 6, steps 61 through 66 may be repeated until the condition $\|e^{(k)}\| < \epsilon$ is satisfied. The registration may be performed in a hierarchical manner. First, the global rigid alignment between the two aorta may be estimated by aligning the two bifurcation points (the illiac and renal bifurcations). This may include solving a direction $v^{(k)}$ (Step S61). Here, the translation at the two bifurcation points is applied to the respective branches and an approximation of the node displacement $u^{(0)}$ may result. Then, a line search may be performed to find a best step size and to update node displacement (Step S62). Node displacement may be set in accordance with the direction $v^{(k)}$ and the best size step (Step S63). A gradient difference may then be calculated (Step S64). The Hessian matrix may then be calculated (Step S65). Calculation of the Hessian matrix may include initializing $B^{(0)}$ with identity. The displacement of all nodes of the 3D graph may be so optimized. The inverted Hessian matrix may then be calculated from the results of Step S65 or using the Sherman-Morrison formula. The first iteration is thereby equivalent to a gradient descent, however, further iterations will be accelerated by $B^{(k)}$, which is the approximated Hessian matrix. Ideally, the inversed Hessian matrix, $B^{(k)-1}$ is positive and nonsingular. However, due to numerical error during the iteration, it may become non-positive or singular. If this happens in a given iteration, $B^{(k)}$ may be reset to the identity matrix. In this case, the scheme is downgraded to gradient descent for that particular iteration.

Accordingly, exemplary embodiments of the present invention may solve for the registration and smoothness constraints on the graph-space, rather than on a dense 3D grid using thin-plane splines (TPS). Accordingly, extra complexity that would have been incurred by using TPS in 3D may be avoided. As the graph is fundamentally a 1D structure, the complexity may be significantly less than the use of TPS in 3D. These efficiency gains may result in faster computation and may limit the degrees-of-freedom (dof) of the system being solved for. This, in turn, may provide for good convergence and robust results.

Figure 2:
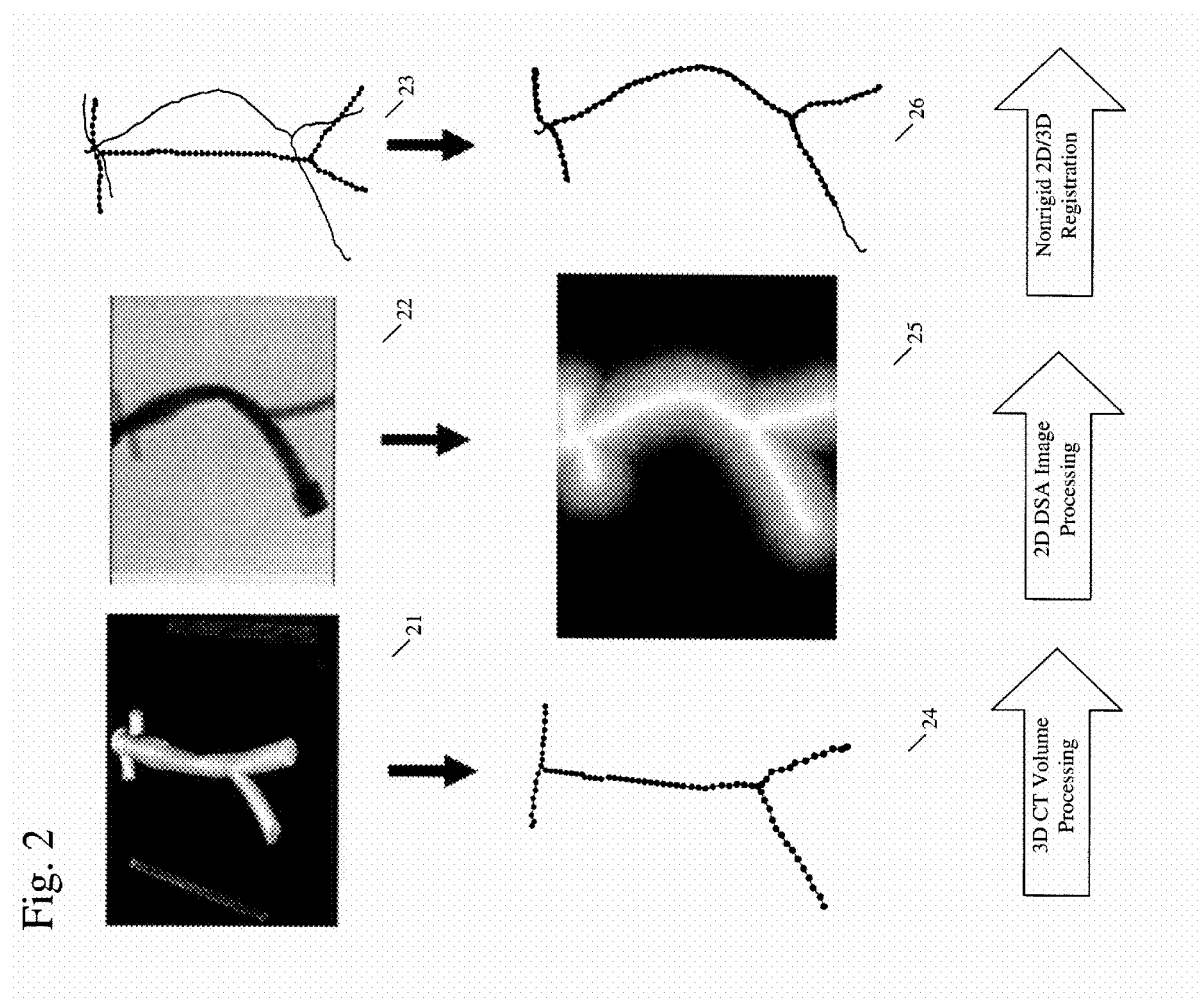
FIG. 2 is a sequence of images illustrating a pipeline of deformable 2D/3D registration for AAA interventions according to an exemplary embodiment of the present invention.

FIG. 2 is a sequence of images illustrating a pipeline of deformable 2D/3D registration for AAA interventions according to an exemplary embodiment of the present invention. Image 11 illustrates simulated "phantom" image data including abdominal aorta, renal arteries, and iliac arteries. The simulated image data provides an example of what a set of DynaCT rotational run acquired on a biplane C-arm system such as the AXIOM Artis manufactured by Siemens Medical Solutions, Erlangen, Germany, may look like. Arterial deformation may be introduced to the phantom to simulate the deformation caused by device insertion and/or organ movement.

Image 24 illustrates the result of graph-cut based segmentation in which the vasculature is effectively segmented. Together, images 11 and 24 illustrate the steps of 3D CT volume processing (steps S11-S12). Image 22 illustrates the acquired 2D intra-operative image data and image 25 illustrates the segmented vessels therein. Segmentation may include the use of a thinning algorithm to find the centerline and thus the white inner pattern of image 25 represents the vessel centerlines. Together, images 22 and 25 illustrate 2D DSA image processing (Steps S13-S15). In image 23, the graph-cut segmentation result of the 3D image (the dotted line) is superimposed with the vessel centerlines from the 2D image (solid line). In image 26, the effect of successful registration may be seen as the graph-cut segmentation result of the 3D image data and the centerlines from the 2D image data are well aligned. Together, images 23 and 26 represent the steps of non-rigid registration (Steps S16-S17).

Multiple datasets may be acquired, resulting in multiple pairs for phantom validation. For a given pair of datasets, the 3D graph from the first dataset and the 2D distance map from the second dataset may be used as the input for registration according to exemplary embodiments of the present invention. The 3D centerline from the second dataset may be used as the ground truth for TRE calculation. One or two 2D X-ray images (here, about 90 degrees apart) may be used for each pair.

Figure 3:
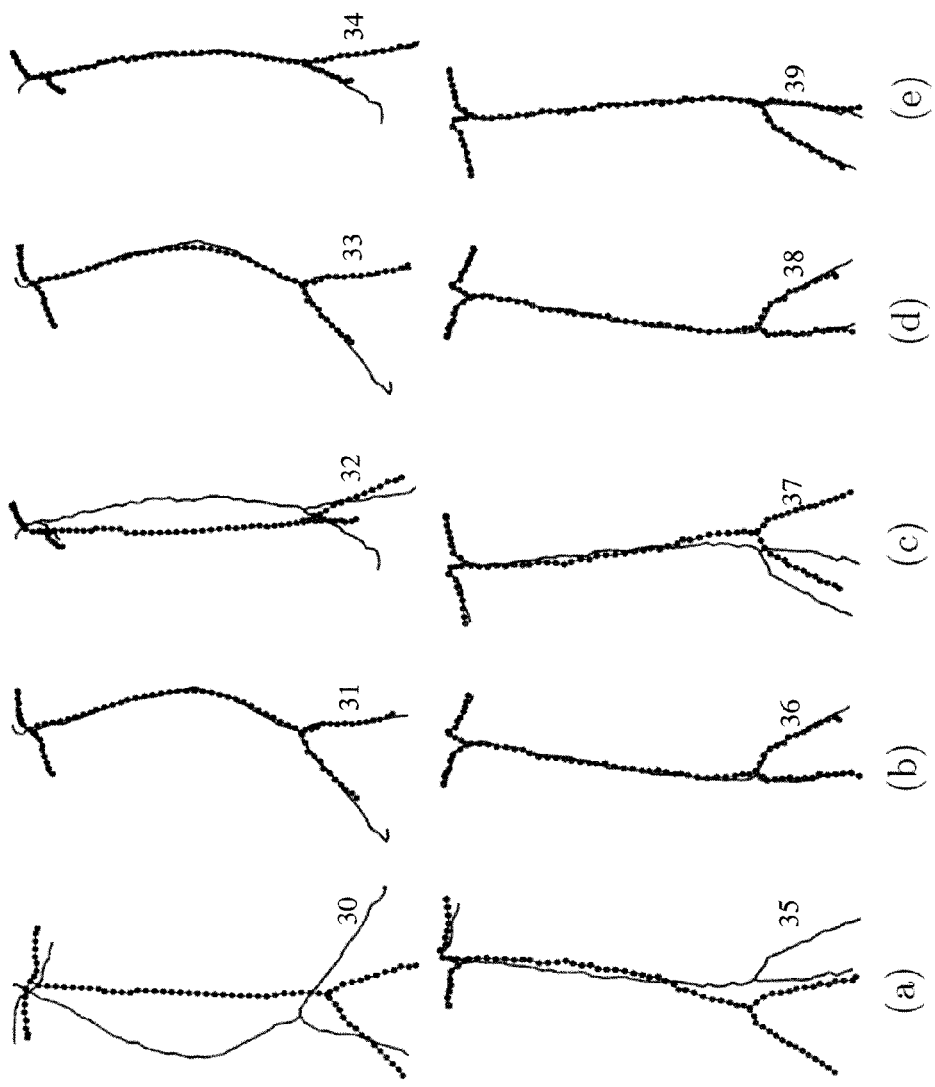
FIG. 3 illustrates a set of exemplary X-ray images that are registered to the 3D centerlines of second data sets according to exemplary embodiments of the present invention.

FIG. 3 illustrates a set of exemplary X-ray images that are registered to the 3D centerlines of second data sets according to exemplary embodiments of the present invention. In these figures, the solid line represents 2D X-ray imagery and the dotted line represents the 3D image graph. Some of the examples shown in FIG. 3 correspond to the quantitative results summarized in Table 1 below. It can be seen that when two 2D X-ray images are used, such as in columns (d) and (e), the registration result is highly accurate in 3D physical space. In comparison, a single projection image alone, such as in columns (b) and (c), may still produce accurate registration in the imaging plane, while the estimation in the depth direction may be largely off. Moreover, registration according to exemplary embodiments of the present invention may take less than 0.1 s to complete. This makes it highly suitable for real-time re-registration during AAA interventions, when the deformation field keeps changing with the insertion of the devices. In addition, by integrating the hierarchical registration scheme, registration according to exemplary embodiments of the present invention may be performed robustly across a wide range of initial offsets, for example, as may be appreciated from FIG. 4.

With respect to FIG. 3, two exemplary sets of phantom image data are illustrated. The first example appears as the images 30-34 of the top row. The second example appears as the images 35-39 of the bottom row. In column (a) (30 and 35), the 3D graph and the ground truth are overlaid to show their initial offset. In columns (b) and (c) (31-32 and 36-37), registration results using one X-ray image are provided. The overlay may be accurate from the imaging plane, as can be seen in column (b) (31 and 36), but not in the physical space as shown from a secondary angle as can be seen in column (c) (32 and 37). For columns (d) and (e) (33-34 and 38-39), registration results using two X-ray images are shown. The overlay is shown from the same angles as those for columns (b) and (c) (31-32 and 36-37).

Figure 4A:
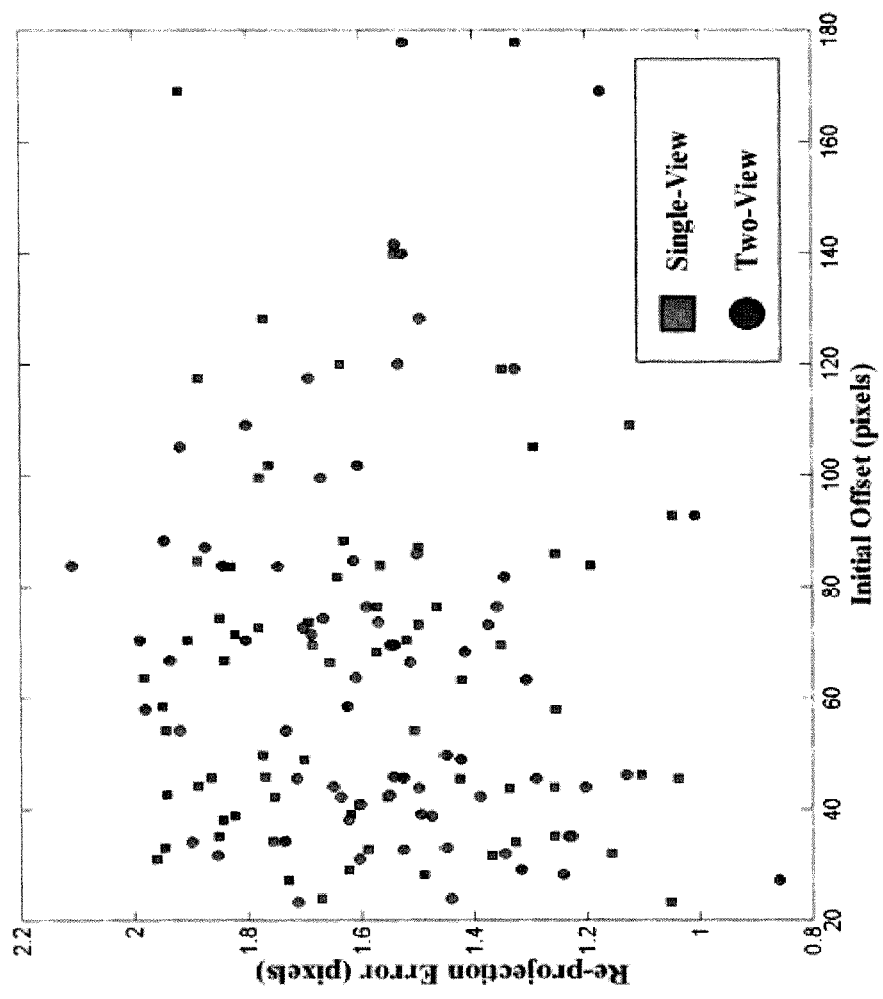
FIGS. 4A and 4B are scatter plots illustrating registration results for 72 pairs of phantom test according to an exemplary embodiment of the present invention.
Figure 4B:
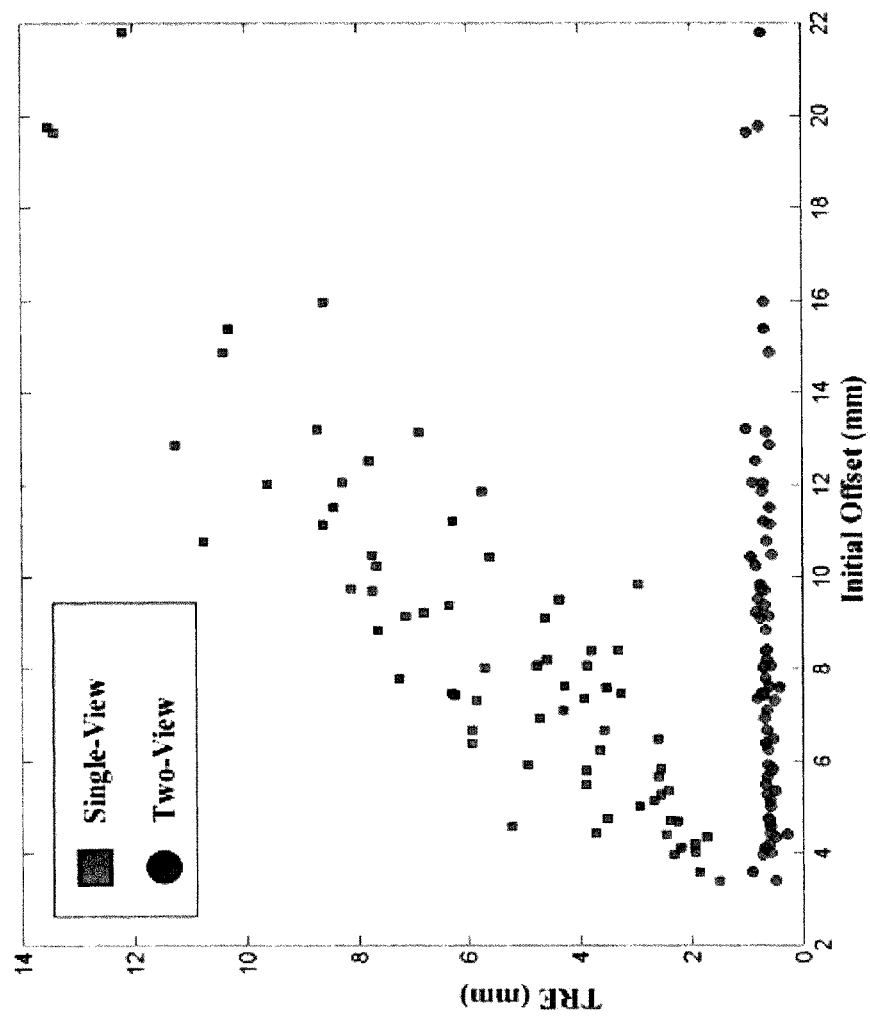

FIGS. 4A and 4B are scatter plots of registration results for 72 pairs of phantom test. The registration TRE is plotted versus the initial offset. In FIG. 4A, re-projection error in the 2D imaging plane is shown. As can be seen, re-projection error may be small across a wide range of initial offsets when either one or two views are used. In FIG. 4B, TRE in 3D, which is consistently small across a wide range of initial o sets when two X-ray images are used, demonstrating a relatively large capture range of the proposed hierarchical registration scheme.

Exemplary embodiments of the present invention may also be applied to actual clinical data, for example, to clinical data from patients suffering from AAA. Here, the 3D graph may be generated from a CT volume of the patient, and may be defaulted by two types of known deformations, one synthesized and one as illustrated in Table 1.

TABLE 1

| Test Type | μ Initial/Registered (mm) | σ Initial/Registered (mm) | Runtime (s) |
| --- | --- | --- | --- |
| Phantom Data, All 72 Pairs | 8.55/0.76 | 3.91/0.33 | 0.075 |
| Clinical Data, with Synthetic Deformation | 15.19/0.95 | 9.27/0.87 | 0.092 |
| Clinical Data, with Natural Deformation | 9.72/0.82 | 5.50/0.73 | 0.088 |

Figure 5:
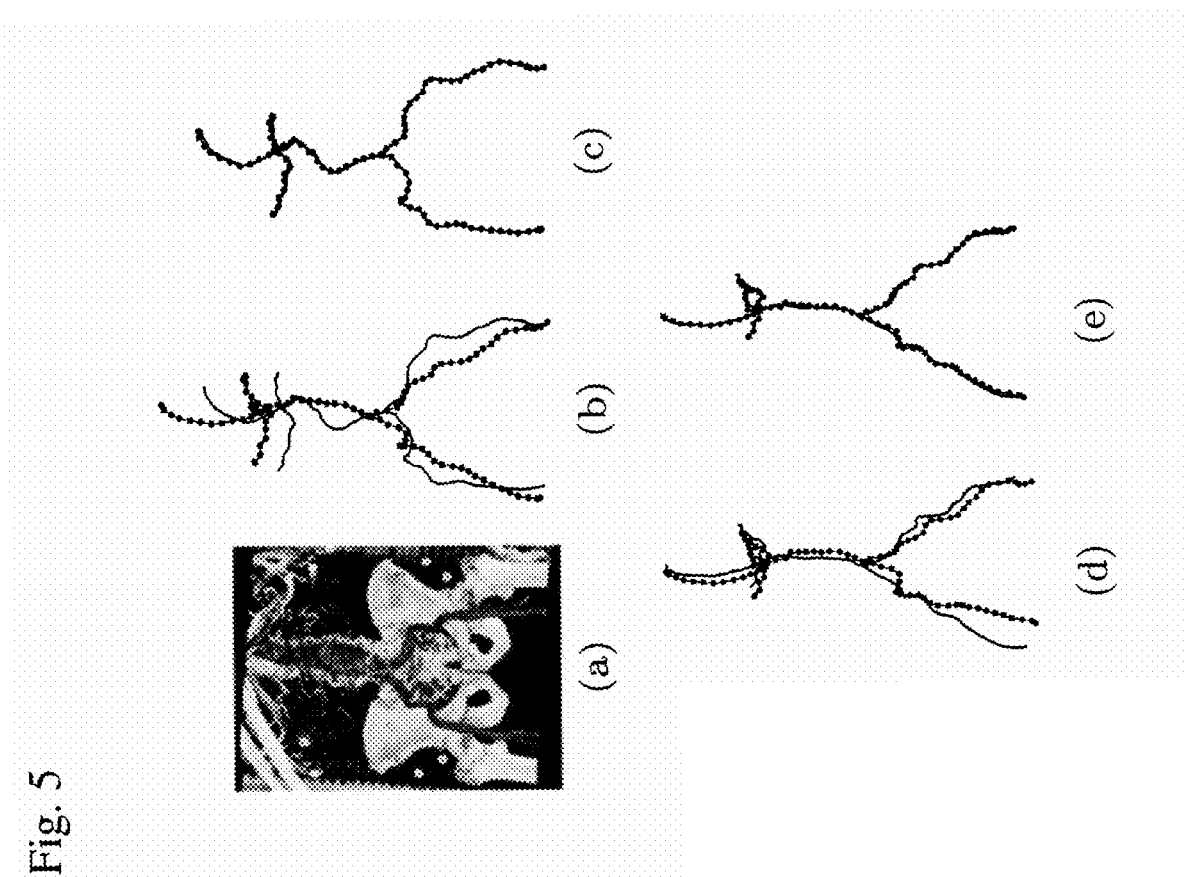
FIG. 5 is a set of images illustrating results of non-rigid registration according to an exemplary embodiment of the present invention.

In obtaining the ground truth for the real patient data, synthesized and natural deformation may be applied to the 3D graph. The synthesized deformation field may be generated using a length preserving deformation function, for example, as illustrated in FIG. 5. The natural deformation field may represent real clinical scenarios and may be obtained by registering the CT volume to the DynaCT volume acquired during the intervention for the respective patient, for example, as seen in FIG. 5, image (d). The deformed 3D graph using either synthesized or natural deformation fields may then be used as the ground truth for quantifying the registration performance. A projection matrix computed from a rigid CTA-to-DSA registration of the respective patient may be used to create the input 2D distance map. Registration in accordance with exemplary embodiments of the present invention, for example, as discussed above, may then be applied using the original 3D graph and the created 2D distance map as the input, and the registration result may be compared to the ground truth. Exemplary experimental results are illustrated in FIG. 5 and quantitative results are summarized in Table 1 above.

With reference to FIG. 5, image (a) is an example of patient CT data, with AAA segmented and shown in mesh. In image (b), the 3D graph and the ground truth with synthesized deformation for patient one are shown. In image (c), registration results of image (b) are shown. In image (d), the 3D graph and the ground truth with natural deformation for patient two are shown. Image (e) illustrates registration result of image (d).

Accordingly, exemplary embodiments of the present invention provide an approach for accurate and efficient deformable 2D/3D registration for abdominal aortic aneurysm interventions. A 3D graph is generated to represent the vascular structure in 3D, and a 2D distance map is computed to smoothly encode the centerline of the vessel shape. This enables the formulation of the problem without a need for establishing explicit correspondence on a 3D graph. A BFGS optimizer may be provided by proper implementation of the gradient of the different terms of the energy functional explicitly on the 3D graph. The results obtained for both phantom and clinical data demonstrates how exemplary embodiments of the present invention may achieve the deformable 2D/3D registration for AAA cases accurately and efficiently. Such approaches may be used for real-time compensation of deformations during the guidance for AAA interventions.

Figure 7:
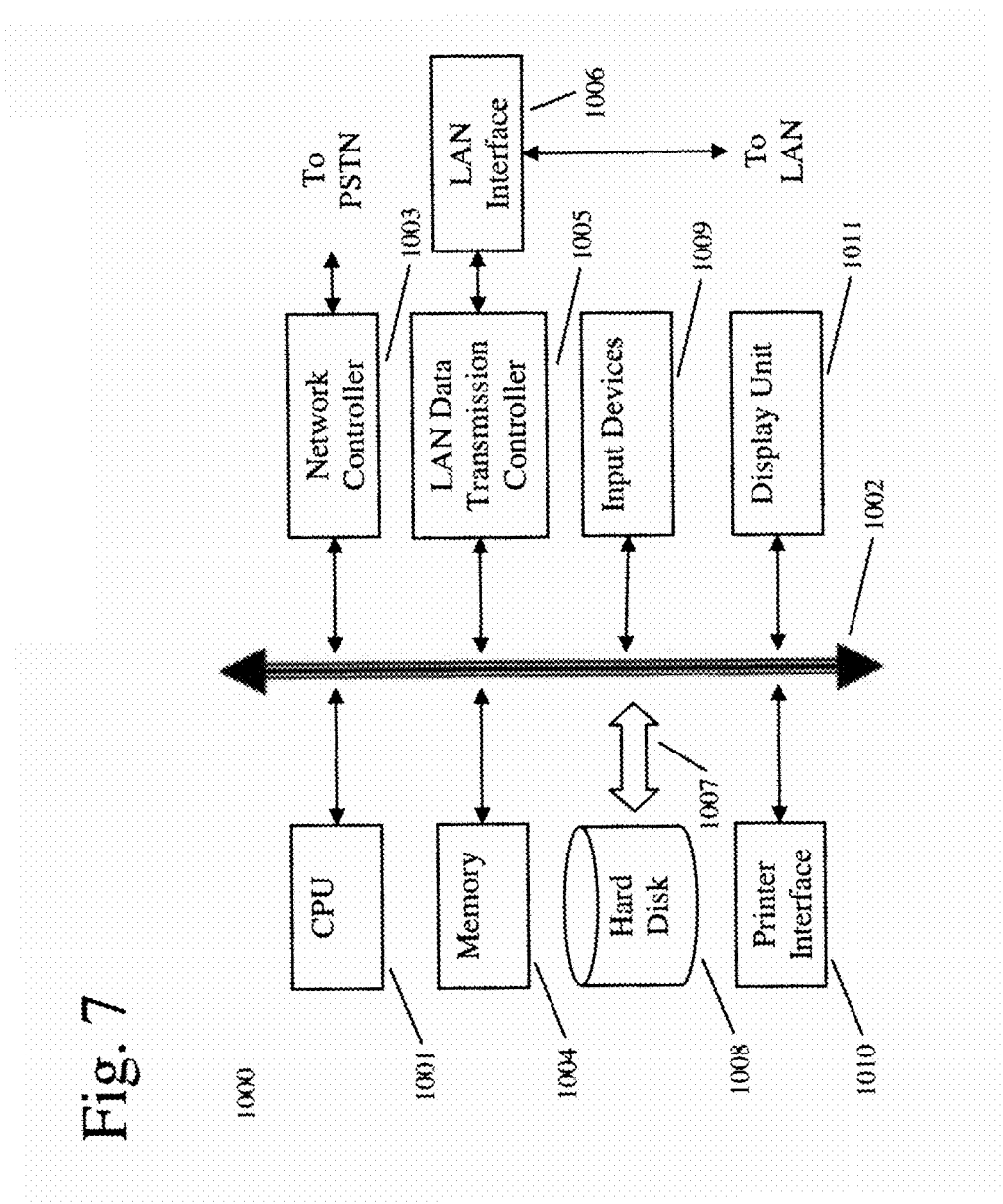
FIG. 7 is an example of a computer system capable of implementing the method and apparatus according to embodiments of the present disclosure.

FIG. 7 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A computer implemented method for performing deformable non-rigid registration of 2D and 3D images of a vascular structure for assistance in surgical intervention, comprising:

acquiring pre-operative 3D image data including the vascular structure;

representing the vascular structure as a graph in which each point of bifurcation of the vascular structure is represented as a node and each vessel segment extended between points of bifurcation of the vascular structure is represented as an edge, based on the 3D image data;

performing graph-based segmentation on the graph to identify a structure of interest;

acquiring intra-operative 2D X-ray image data including the vascular structure;

segmenting the structure of interest within the 2D image data;

expressing a difference between the structure of interest within the 3D image data and the structure of interest within the 2D image data as an energy that is calculated as a function of a measure of distance between the structure of interest within the 3D image data and the structure of interest within the 2D image data, a length preserving term, a smoothing term, and coefficients for balancing the length preserving term and smoothing term, respectively; and minimizing the expressed energy to perform non-rigid registration between the structure of interest within the 3D image data and the structure of interest within the 2D image data.

2. The method of claim 1, wherein the pre-operative 3D image data is computed tomography (CT) volume data.

3. The method of claim 1, wherein the graph-based segmentation includes graph-cut segmentation wherein the graph is split into multiple segments based on relative weakness in edge attachments.

4. The method of claim 1, wherein the intra-operative 2D X-ray image data is acquired using a fluoroscope.

5. The method of claim 1, wherein expressing the difference between the structure of interest within the 3D image data and the structure of interest within the 2D image data as an energy includes calculating a sum of a distance energy, a length preservation energy, and a deformation smoothness energy.

6. The method of claim 5, wherein the length preservation energy is calculated according to the equation:

$$\mathcal{E}_l = -\sum_{i=1}^{n} k_i \|u_i\|_{\tau_i}$$

wherein $\tau_i$ represents a unit vector along vessel centerline, u represents displacement and k represents a spring constant.

7. The method of claim 5, wherein the deformation smoothness energy is calculated according to the equation:

$$\mathcal{E}_l = \nabla \cdot u$$

wherein u represents displacement.

8. The method of claim 5, wherein minimizing the expressed energy includes utilizing a gradient dissent approach whereby a gradient is calculated for the expressed energy, an initial guess of the displacement vector is produced and the initial guess is iterated until a norm of the gradient drops below a predetermined threshold.

9. A computer implemented method for performing deformable non-rigid registration of 2D and 3D images of a vascular structure for assistance in surgical intervention, comprising:

acquiring pre-operative 3D image data including the vascular structure;

representing the vascular structure as a graph in which each point of bifurcation of the vascular structure is represented as a node and each vessel segment extended between points of bifurcation of the vascular structure is represented as an edge, based on the 3D image data;

performing graph-based segmentation on the graph to identify a structure of interest;

acquiring intra-operative 2D X-ray image data including the vascular structure;

segmenting the structure of interest within the 2D image data;

expressing a difference between the structure of interest within the 3D image data and the structure of interest within the 2D image data as an energy; and minimizing the expressed energy to perform non-rigid registration between the structure of interest within the 3D image data and the structure of interest within the 2D image data, wherein expressing the difference between the structure of interest within the 3D image data and the structure of interest within the 2D image data as an energy includes calculating a sum of a distance energy, a length preservation energy, and a deformation smoothness energy, and wherein the distance energy is calculated according to the equation:

$$\mathcal{E}_d = \sum_{i=1}^{n} \mathcal{D}(\Pi(x_i + u_i))$$

wherein $\mathcal{D}$ is the distance transform image, $\Pi$ is the projection matrix corresponding to the X-ray image, u represents displacement and $x_i$ represents the 3D vessel centerlines.

10. A computer implemented method for performing deformable non-rigid registration of 2D and 3D images of a vascular structure for assistance in surgical intervention, comprising:

acquiring pre-operative 3D image data including the vascular structure;

representing the vascular structure as a graph in which each point of bifurcation of the vascular structure is represented as a node and each vessel segment extended between points of bifurcation of the vascular structure is represented as an edge, based on the 3D image data;

performing graph-based segmentation on the graph to identify a structure of interest;

acquiring intra-operative 2D X-ray image data including the vascular structure;

segmenting the structure of interest within the 2D image data;

expressing a difference between the structure of interest within the 3D image data and the structure of interest within the 2D image data as an energy; and minimizing the expressed energy to perform non-rigid registration between the structure of interest within the 3D image data and the structure of interest within the 2D image data, wherein the energy is expressed in accordance with the following equation:

$$\mathcal{E}(u) = \mathcal{D}(u) + \alpha \mathcal{S}_L(u) + \beta \mathcal{S}_D(u)$$

wherein u represents displacement, $\mathcal{D}(u)$ represents a difference measure, $\mathcal{S}_L(u)$ represents a length preserving term, $\mathcal{S}_D(u)$ represents a smoothing term, and $\alpha$ and $\beta$ are coefficients for balancing the length preserving term and the smoothing term, respectively.

11. The method of claim 10, wherein the difference measure $\mathcal{D}(u)$ is calculated according to the equation:

$$\mathcal{D} = \frac{1}{n}\sum_{i=1}^{n} M^2(d(y_i))$$

wherein n is the number of nodes, $d(y_i)$ is a 2D projection of an $i^{th}$ displaced node $y_i$ and M is a 2D distance map.

12. The method of claim 10, wherein the length preserving term $\mathcal{S}_L$ (u) is calculated according to the equation:

$$S_\mathcal{L} = \frac{1}{n}\sum_{i=1}^{n} \sum_{j=1}^{t_i} \left(\frac{l_j^p - l_j}{l_j}\right)^2$$

wherein n is the number of nodes, $l_j$ is an original length of an edge and $l_j^p$ is a new length of the same edge after deformation.

13. The method of claim 12, wherein the deformation is defined as $l_j^p = \|(x_j + u_j) - (x_i u_i)\|$ wherein the displacement node $y_i = x_i + u_i$.

14. The method of claim 10, wherein the smoothness term $\mathcal{S}_D$ (u) is calculated according to the equation:

$$S_\mathcal{D} = \frac{1}{n}\sum_{i=1}^{n} \sum_{j=1}^{t_i} \|u_i - u_j\|^2$$

wherein n is the number of nodes and u represents displacement.

15. A computer implemented method for performing deformable non-rigid registration of 2D and 3D images of a vascular structure for assistance in surgical intervention, comprising:
acquiring 3D image data;
segmenting an abdominal aorta from the 3D image data using graph-cut based segmentation to produce a segmentation mask;
generating centerlines from the segmentation mask using a sequential topological thinning process;
generating 3D graphs from the generated centerlines;
acquiring 2D image data;
segmenting the 2D image data to produce a distance map;
defining an energy function based on the 3D graphs and the distance map, the energy function being a function of a measure of distance between the 3D graphs and the segmented 2D image data, a length preserving term, a smoothing term, and coefficients for balancing the length preserving term and smoothing term, respectively; and
minimizing the energy function to perform non-rigid registration between the 3D image data and the 2D image data.

16. A computer implemented method for performing deformable non-rigid registration of 2D and 3D images of a vascular structure for assistance in surgical intervention, comprising:
acquiring 3D image data
segmenting an abdominal aorta from the 3D image data using graph-cut based segmentation to produce a segmentation mask;
generating centerlines from the segmentation mask using a sequential topological thinning process;
generating 3D graphs from the generated centerlines;
acquiring 2D image data
segmenting the 2D image data to produce a distance map;
defining an energy function based on the 3D graphs and the distance map; and
minimizing the energy function to perform non-rigid registration between the 3D image data and the 2D image data,
wherein the energy function is calculated according to the equation:

$$\mathcal{E}_d = \sum_{i=1}^{n} \mathcal{D}(\Pi(x_i + u_i))$$

wherein $\mathcal{D}$ is the distance transform image, $\Pi$ is the projection matrix corresponding to the X-ray image, u represents displacement and $x_i$ represents the 3D vessel centerlines.

17. A computer implemented method for performing deformable non-rigid registration of 2D and 3D images of a vascular structure for assistance in surgical intervention, comprising:
acquiring 3D image data
segmenting an abdominal aorta from the 3D image data using graph-cut based segmentation to produce a segmentation mask;
generating centerlines from the segmentation mask using a sequential topological thinning process;
generating 3D graphs from the generated centerlines;
acquiring 2D image data;
segmenting the 2D image data to produce a distance map;
defining an energy function based on the 3D graphs and the distance map; and
minimizing the energy function to perform non-rigid registration between the 3D image data and the 2D image data,
wherein the energy function is expressed in accordance with the following equation:

$$\mathcal{E}(u) = \mathcal{D}(u) + \alpha \mathcal{S}_L(u) + \beta \mathcal{S}_D(u)$$

wherein u represents displacement, $\mathcal{D}$ (u) represents a difference measure, $\mathcal{S}_L$ (u) represents a length preserving term, $\mathcal{S}_D$ (u) represents a smoothing term, and α and β are coefficients for balancing the length preserving term and the smoothing term, respectively.

18. A non-transitory, tangible, machine-readable medium, embodying a program of instructions executable by a processor to perform method steps for performing deformable non-rigid registration of 2D and 3D images of a vascular structure for assistance in surgical intervention, the machine readable medium comprising code for:
acquiring 3D image data;
segmenting an abdominal aorta from the 3D image data using graph-cut based segmentation to produce a segmentation mask;
generating centerlines from the segmentation mask using a sequential topological thinning process;
generating 3D graphs from the generated centerlines;
acquiring 2D image data;
segmenting the 2D image data to produce a distance map, the energy function being a function of a measure of distance between the 3D graphs and the segmented 2D image data, a length preserving term, a smoothing term, and coefficients for balancing the length preserving term and smoothing term, respectively;
defining an energy function based on the 3D graphs and the distance map; and minimizing the energy function to perform non-rigid registration between the 3D image data and the 2D image data.

19. A non-transitory, tangible, machine readable medium, embodying a program of instructions executable by a processor to perform method steps for performing deformable non-rigid registration of 2D and 3D images of a vascular structure for assistance in surgical intervention, the machine readable medium comprising code for:
acquiring 3D image data;
segmenting an abdominal aorta from the 3D image data using graph-cut based segmentation to produce a segmentation mask;
generating centerlines from the segmentation mask using a sequential topological thinning process;
generating 3D graphs from the generated centerlines;
acquiring 2D image data;
segmenting the 2D image data to produce a distance map;
defining an energy function based on the 3D graphs and the distance map; and
minimizing the energy function to perform non-rigid registration between the 3D image data and the 2D image data,
wherein the energy function is calculated according to the equation:

$$\mathcal{E}_d = \sum_{i=1}^{n} \mathcal{D}(\Pi(x_i + u_i))$$

wherein $\mathcal{D}$ is the distance transform image, $\Pi$ is the projection matrix corresponding to the X-ray image, u represents displacement and $x_i$ represents the 3D vessel centerlines.

20. A non-transitory, tangible, machine readable medium, embodying a program of instructions executable by a processor to perform method steps for performing deformable non-rigid registration of 2D and 3D images of a vascular structure for assistance in surgical intervention, the machine readable medium comprising code for:
acquiring 3D image data;
segmenting an abdominal aorta from the 3D image data using graph-cut based segmentation to produce a segmentation mask;
generating centerlines from the segmentation mask using a sequential topological thinning process;
generating 3D graphs from the generated centerlines;
acquiring 2D image data;
segmenting the 2D image data to produce a distance map;
defining an energy function based on the 3D graphs and the distance map; and
minimizing the energy function to perform non-rigid registration between the 3D image data and the 2D image data,
wherein the energy function is expressed in accordance with the following equation:

$$\mathcal{E}(u) = \mathcal{D}(u) + \alpha \mathcal{S}_L(u) + \beta \mathcal{S}_D(u)$$

wherein u represents displacement, $\mathcal{D}(u)$ represents a difference measure, $\mathcal{S}_L(u)$ represents a length preserving term, $\mathcal{S}_D(u)$ represents a smoothing term, and $\alpha$ and $\beta$ are coefficients for balancing the length preserving term and the smoothing term, respectively.

* * * * *